United States Patent
Naccari et al.

(10) Patent No.: US 11,037,522 B2
(45) Date of Patent: Jun. 15, 2021

(54) METHOD FOR RADIOMETRIC DISPLAY, CORRESPONDING SYSTEM, APPARATUS AND COMPUTER PROGRAM PRODUCT

(71) Applicant: STMicroelectronics S.r.l., Agrate Brianza (IT)

(72) Inventors: Filippo Naccari, Tremestieri Etneo (IT); Mirko Guarnera, La Punta (IT); Simone Bianco, Milan (IT); Raimondo Schettini, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 340 days.

(21) Appl. No.: 16/047,768

(22) Filed: Jul. 27, 2018

(65) Prior Publication Data

US 2018/0336865 A1   Nov. 22, 2018

Related U.S. Application Data

(62) Division of application No. 14/870,131, filed on Sep. 30, 2015, now Pat. No. 10,152,944.

(30) Foreign Application Priority Data

Dec. 24, 2014 (IT) .......................... TO2014A001099

(51) Int. Cl.
  *G09G 5/02* (2006.01)
  *G06T 7/90* (2017.01)
  (Continued)

(52) U.S. Cl.
  CPC ............... *G09G 5/02* (2013.01); *G06T 7/90* (2017.01); *G09G 3/002* (2013.01);
  (Continued)

(58) Field of Classification Search
  None
  See application file for complete search history.

(56) References Cited

U.S. PATENT DOCUMENTS

| 4,985,853 A | * | 1/1991 | Taylor | ..................... G09G 5/02 |
| | | | | 345/604 |
| 6,414,690 B1 | | 7/2002 | Balasubramanian et al. | |
| | | | (Continued) | |

FOREIGN PATENT DOCUMENTS

EP            1942680 A2      7/2008

OTHER PUBLICATIONS

Ashdown et al., "Robust Content-Dependent Photometric Projector Compensation," Computer Vision and Pattern Recognition Workshop, 2006, CVPRW06, Conference on IEEE, 2006, pp. 1-8.

(Continued)

*Primary Examiner* — Bernard Krasnic
(74) *Attorney, Agent, or Firm* — Slater Matsil, LLP

(57) ABSTRACT

Color signals to be displayed on a colored display surface and having a first gamut in a color space, are subjected to radiometric compensation. An embodiment includes displaying on the colored surface a set of control points of a known color, acquiring via a camera the control points as displayed on the colored surface and evaluating at least one second color gamut of the control points displayed on the colored surface. The second color gamut(s) is/are misaligned with respect to the first color gamut due to the display surface being a colored surface. The method may also include evaluating as an intersection gamut, the misalignment of the second color gamut(s) with respect to the first color gamut, calculating the color transformation operator(s) as a function of the misalignment evaluated, and applying the color transformation operator(s) to the color signals for display on the colored display surface.

17 Claims, 9 Drawing Sheets

(51) Int. Cl.
  *H04N 9/31* (2006.01)
  *H04N 1/60* (2006.01)
  *G09G 3/00* (2006.01)
  *H04N 9/67* (2006.01)

(52) U.S. Cl.
  CPC ......... *H04N 1/6088* (2013.01); *H04N 1/6097* (2013.01); *H04N 9/3182* (2013.01); *H04N 9/3194* (2013.01); *H04N 9/67* (2013.01); *G09G 2320/0242* (2013.01); *G09G 2340/06* (2013.01)

(56) References Cited

U.S. PATENT DOCUMENTS

| | | | |
|---|---|---|---|
| 8,289,344 B2* | 10/2012 | Marcu | G09G 5/02 345/590 |
| 8,390,644 B2* | 3/2013 | Marcu | G09G 5/02 345/590 |
| 10,152,944 B2* | 12/2018 | Naccari | G09G 5/02 |
| 2005/0134599 A1 | 6/2005 | Nayar | |
| 2010/0060911 A1 | 3/2010 | Marcu | |
| 2010/0110312 A1 | 5/2010 | Muijs et al. | |
| 2010/0302271 A1 | 12/2010 | Sloan | |
| 2013/0050504 A1 | 2/2013 | Safaee-Rad et al. | |
| 2013/0135338 A1* | 5/2013 | Gille | G09G 3/3466 345/596 |
| 2014/0320827 A1 | 10/2014 | Grundhofer | |

OTHER PUBLICATIONS

Grundhoefer et al., "Real-Time Adaptive Radiometric Compensation," IEEE Transactions on Visualization and Computer Graphics, vol. 14, No. 1, Jan./Feb. 2008, pp. 97-108.

Madi et al., "Color constancy for visual compensation of projector displayed image," Departement d'Informatique, Universite de Sherbrooke, Sherbrooke, Quebec, Canada, Jan. 2014, pp. 6-17.

Nayar et al., "A Projection System with Radiometric Compensation for Screen Imperfections," ICCV Workshop on Projector-Camera Systems (PROCAMS), vol. 3, 2003, pp. 1-8.

Park, Sun Hee "Adaptive Chrominance Correction for a Projector Considering Image and Screen Color," Springer-Verlag Berlin Heidelberg, ISVC 2007, Part II, LNCS 4842, pp. 751-759.

Sharma, "LCDs versus CRTs-color-calibration and Gamut Considerations," Proceedings of the IEEE 90.4 (Aug. 2002), pp. 605-622.

Sun, Hee Park et al. "Adaptive Chrominance Correction for a Projector Considering Image and Screen color," (Nov. 26, 2007), Advances in Visual Computing; [Lecture Notes in Computer Science], Springer Berlin Heidelberg, pp. 751-759, XP019083476. ISBN: 978-3-540-76855-5.

* cited by examiner

METHOD FOR RADIOMETRIC DISPLAY, CORRESPONDING SYSTEM, APPARATUS AND COMPUTER PROGRAM PRODUCT

CROSS-REFERENCE TO RELATED APPLICATIONS

This application is a divisional of U.S. patent application Ser. No. 14/870,131 entitled "Method for Radiometric Display, Corresponding System, Apparatus and Computer Program Product," filed Sep. 30, 2015, which application claims the benefit of Italian Application No. TO2014A001099, filed on Dec. 24, 2014, which applications are hereby incorporated herein by reference.

TECHNICAL FIELD

The description relates to radiometric compensated display of signals, e.g. image signals.

One or more embodiments may apply to projection systems, such as e.g. pico-projection systems.

BACKGROUND

Following the wide use of cameras and sensors in handheld smartphones, tablets and mobile devices, a wide use of handheld projection systems is expected for the future, which may lead to displaying images on any kind of surfaces, e.g. surfaces not specifically intended to be used as display screens.

SUMMARY

In the scenario discussed in the foregoing, the need is felt for systems capable of displaying (e.g. projecting images) on colored surfaces by maintaining accurate color rendition irrespective of the characteristics of the display surface.

One or more embodiments may refer to a corresponding system, corresponding apparatus including e.g. a digital image projector, as well as to a computer program product loadable into the memory of at least one computer and including software code portions for executing the steps of the method when the product is run on at least one computer. As used herein, reference to such a computer program product is understood as being equivalent to reference to a computer-readable medium containing instructions for controlling the processing system in order to coordinate implementation of the method according to the embodiments. Reference to "at least one computer" is intended to highlight the possibility for the present embodiments to be implemented in modular and/or distributed form.

One or more embodiments may provide an effective approach for displaying images on colored surfaces while maintaining accurate color rendition.

One or more embodiments may be able to compensate for the color of a display surface by an interoperable display/camera system.

One or more embodiments may be able to compensate the color of a display surface of a uniform color.

One or more embodiments may be able to compensate the color of a display surface including different areas with different colors.

One or more embodiments may thus address the problem of displaying images on a colored surface while maintaining a good color appearance.

One or more embodiments may rely on an improved technique for managing different color gamuts (e.g. the range of colors displayable) on different areas of a display surface.

One or more embodiments may exhibit a high accuracy of the colors displayed on the display surface in terms of brightness and chromaticity and channel clipping control.

One or more embodiments may be content-unaware, that is they do not take into account image content.

One or more embodiments may adopt a color transform for each colored area of the display surface or just one color transform if the display surface is of a single color.

One or more embodiments may rely on a gamut intersection technique which enables good color accuracy to be maintained in images displayed on colored surfaces thus making it possible to dispense with the need for a white display (e.g. projection) surface to obtain realistic colors.

One or more embodiments may be adapted for use in displaying images with a good color accuracy on colored surfaces, such as e.g. colored walls, clothes, human body parts for medical applications.

One or more embodiments may include a capture device such as e.g. a camera and a display device such as e.g. a projector.

One or more embodiments may involve a combination of firmware/hardware (FW/HW) features, e.g. a display image processor and associated memory applying the final color transform, while FW embodiments are responsible for determining the color transform to be applied.

In one or more embodiments, display processor operation may be regarded as "quasi/static", e.g. once calculated, transformations will be applied for all the frames in an image sequence, e.g. a video stream, with the rate of possible re-calculation of the transformation made dependent on display performance.

Displaying reference colors on different colored surfaces of known reflectance of a display surface while using a colorimeter to measure the reflected color from the surface may reveal the approach adopted for compensating the color of the display surface.

BRIEF DESCRIPTION OF THE DRAWINGS

One or more embodiments will now be described, purely by way of non-limiting example, with reference to the annexed figure, wherein.

DETAILED DESCRIPTION OF ILLUSTRATIVE EMBODIMENTS

Figure 1:
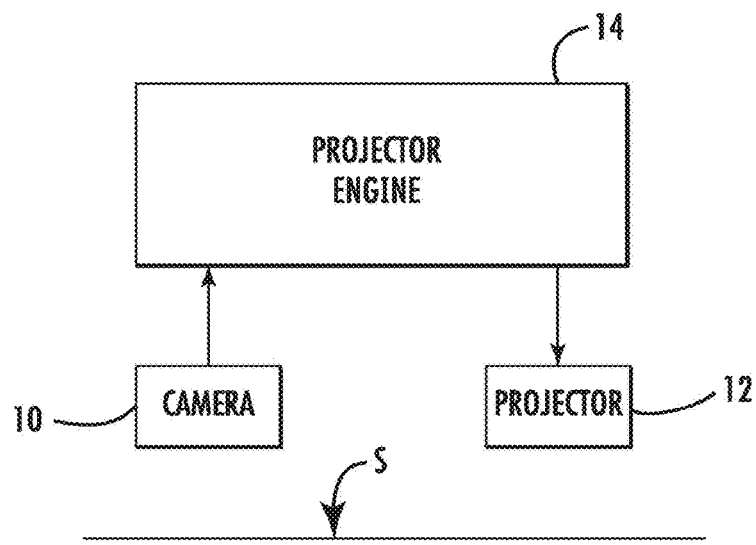
FIG. 1 is a general block diagram of apparatus adapted to include one or more embodiments.

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

Radiometric compensation is the subject matter of fairly extensive technical literature.

For instance, Anselm Grundhöfer and Oliver Bimbe, "Real-Time Adaptive Radiometric Compensation", IEEE Transations on Visualization and Computer Graphics, vol. 14, no. 1, January/February 2008, pp. 97-108 disclose an arrangement where an intensity clipping control is performed without however analyzing and controlling an extended chromatic displayable range with accurate channel clipping control.

The approach disclosed in Madi, Abdeldjalil, and Djemel Ziou: "Color constancy for visual compensation of projector displayed image." Displays 35.1 (2014): 6-17 is based on a parameter estimation process over certain color domains without using perceptually uniform spaces.

The approach disclosed in Nayar, Shree K., et al. "A projection system with radiometric compensation for projection surface imperfections." ICCV workshop on projector-camera systems (PROCAMS). Vol. 3. 2003 does not perform the analysis of the potential gamut on the projection surface, which leads to unavoidable clipping artifacts.

The article by Ashdown, Mark, et al. "Robust content-dependent photometric projector compensation." Computer Vision and Pattern Recognition Workshop, 2006, CVPRW '06. Conference on. IEEE, 2006 discloses combined off-line radiometric model and a content-dependent compensation, which involves extensive use of computational resources during the projection.

Document US2005/0134599 A1 discloses methods and systems for displaying images onto an arbitrary surface, using a projector, such that the quality of the images is preserved despite surface imperfections or color variations, while also controlling the appearance of a projection surface. Use is disclosed of a detailed radiometric model and a calibration method to determine the pixel values required to be projected by a projector in order for a camera to observe a desired image. A compensation algorithm is also disclosed that uses a feedback approach to provide a desired image compensation. Geometric mapping may be used to establish a correspondence between points in the images to be displayed by the projector and the corresponding points in the images that are captured by the camera.

It was noted that content-aware online models require more computational resources even if in theory they might produce better results.

One or more embodiments as disclosed herein may implement channel clipping based on a judicious trade-off between color accuracy and channel clipping of colors that cannot be displayed on a specific colored surface.

One or more embodiments as disclosed herein may adopt a closed loop (e.g. projector/camera) radiometric compensation technique and rely on an effective approach in managing the intersection/s of color gamut/s in each part of a colored (e.g. planar) display surface.

Certain technical definitions will now be recalled by way of introduction to the detailed description of one or more exemplary embodiments.

sRGB is a standard color space created in 1996 for use in monitors, printers and the Internet.

The CIE XYZ 1931 color space, briefly XYZ, was the first mathematically defined standard color space created by the International Commission on Illumination in 1931 based on experimental results on human visual system. The XYZ tristimulus values are representative of the responses of the cone (photoreceptors) in the human eye.

The CIELab color space, briefly Lab, is a color space derived from CIE 1931 XYZ color space; the CIELab color space is exemplary of a perceptually uniform space, that is a space where a change of a certain amount in a color value will produce a change of about the same visual importance.

In color reproduction, a gamut is a (sub)set of colors, adapted to be represented under certain conditions by a certain output device.

One of the main properties of a color is hue; the dominant wavelength (or sometimes equivalent wavelength) is a physical analog to hue as a perceptual attribute.

Saturation is the colorfulness of a color relative to its own brightness. A highly colorful stimulus is vivid and intense, while a less colorful stimulus appears more muted, closer to gray.

The DeltaE 94 color difference, briefly $\Delta E(1994)$, is a widely used metrics used in color science to measure the difference between colors. $\Delta E(1994)$ is defined in the Lch perceptually uniform color space (representation of CieLab color space in cylindrical coordinates) with differences in lightness, chroma and hue calculated from L*a*b* coordinates.

FIG. 1 is a general block diagram of apparatus including a camera 10 and a projector 12 operatively connected to a projector engine 14.

Reference S denotes a projection surface for the signals projected by the projector 12. The camera 10 may act as a capture device adapted to "frame" the surface S and generate signals representative of the projections on the surface S.

Other than for the details exemplified in the following, the camera 10 and the projector 12 may be of any known type. Similarly, the surface S may be other than a projection screen and may include e.g. a wall, a piece of furniture, a vehicle, human body parts.

More generally, one or more embodiments may apply to the display of (e.g. image) signals other than by projection on a colored surface. One or more embodiments may in fact apply to display of signals on e.g. a LCD or plasma display device wherein the display surface being uniformly or non-uniformly colored (e.g. due to printed matter thereon) may result in a change of the colors being displayed. This may apply e.g. to so-called "maxiscreens" including plural display units (e.g. LCD, plasma, OLED) arranged side-by-side.

Figure 2:
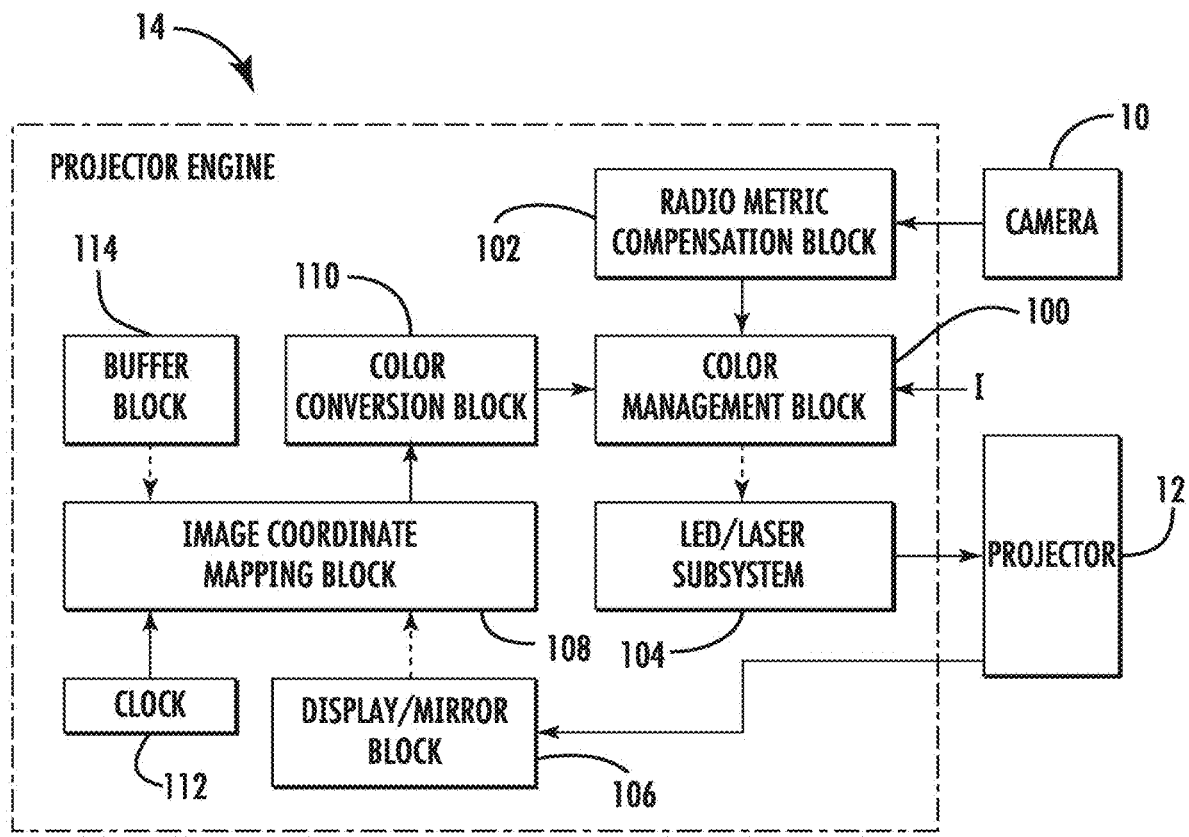
FIG. 2 is a block diagram exemplary of one or more embodiments.

FIG. 2 is a more detailed block diagram showing an exemplary arrangement for the projector engine 14.

In one or more embodiments, the projector engine 14 may include a color management block 100 receiving signals from a radiometric compensation block 102 sensitive to signals from the camera 10.

Output signals from the color management block 100 may be fed to a Led/Laser subsystem or block 104 to drive the projector 12.

Signals from a display/mirror subsystem or block 106 sensitive to the operating conditions of the projector 12 (e.g. the coordinates of points/pixels projected on the surface S) may be fed to an image coordinate mapping block 108 whose output is fed to a color conversion block 110, whose output is in turn fed to the color management block 100.

Reference numerals 112 and 114 indicate a system clock and a buffer block, respectively.

Blocks appearing in the diagrams illustrated in the figures annexed to this description are exemplary of modules/functions adapted to be implemented both as hardware (HW), possibly as firmware (FW), and/or in software (SW) form. Also, individual exemplary blocks in the figures may be either integrated to combined blocks or partitioned into plural (sub)blocks. Additionally, while illustrated separately in e.g. FIG. 2 for the sake of description, the projector engine 14 may be partly or wholly incorporated to the camera 10 and/or the projector 12.

Specific application requirements and design options may dictate the selection of any of these possible implementations.

Figure 3:
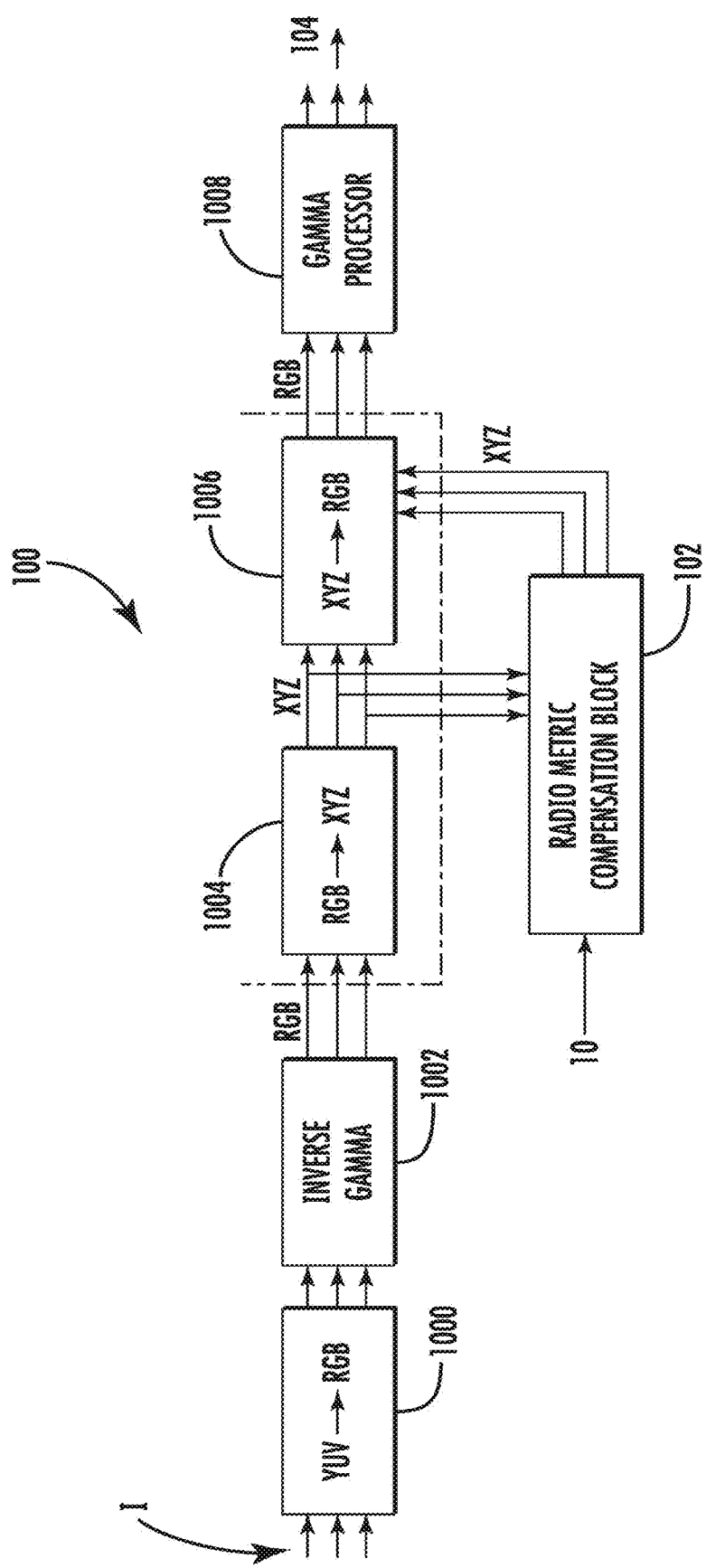
FIGS. 3 to 5 are block diagrams exemplary of possible details of one or more embodiments.

FIG. 3 is a further detailed block diagram showing an exemplary arrangement for the color management block 100.

Input signals I to be projected via the projector 12 are received e.g. as digital video signals from any known source for that purpose (e.g. a camera, a DVD or BD player, a video stream source and the like).

In that respect it will be appreciated that the rest of this description will refer to the camera 10 primarily in connection with radiometric compensation as exemplified herein.

In one or more embodiments, the input signals I may be converted e.g. from YUV to a RGB format in a block 1000 (if not already in the RGB format), and subjected to inverse gamma distribution processing (INV Gamma) in a block 1002 to be then fed to the core of color management processing as exemplified herein, which includes: RGB to XYZ conversion in a block 1004 to produce data converted to a (device-independent) XYZ space for feeding to the radiometric compensation block 102, and XYZ to RGB (back)conversion in a block 1006 which receives from the block 102 the results of radiometric compensation and produce radiometric compensated data to be fed (here after gamma processing in a block 1008) to the Led/Laser subsystem 102 for projection via the projector 12.

Processing of digital video signals as exemplified herein (e.g. YUV to RGB conversion, (inverse) gamma distribution processing, RGB to XYZ and XYZ to RGB conversion) is per se conventional in the art (see e.g. Sharma, Gaurav: "LCDs versus CRTs-color-calibration and gamut considerations." Proceedings of the IEEE 90.4 (2002): 605-622.), possibly in the form of a color management pipeline, thus making it unnecessary to provide a more detailed description herein.

Irrespective of their representation e.g. as YUV or RGB signals, the input color signals I will comprise a (first) gamut, that is a first (sub)set of colors, adapted to be represented (displayed) under certain conditions by a certain output device e.g. by being projected by the projector 12.

Radiometric compensation as discussed herein is intended to take into account and compensate the effect on such gamut due to the display surface S being colored (uniformly or non-uniformly).

Figure 4:
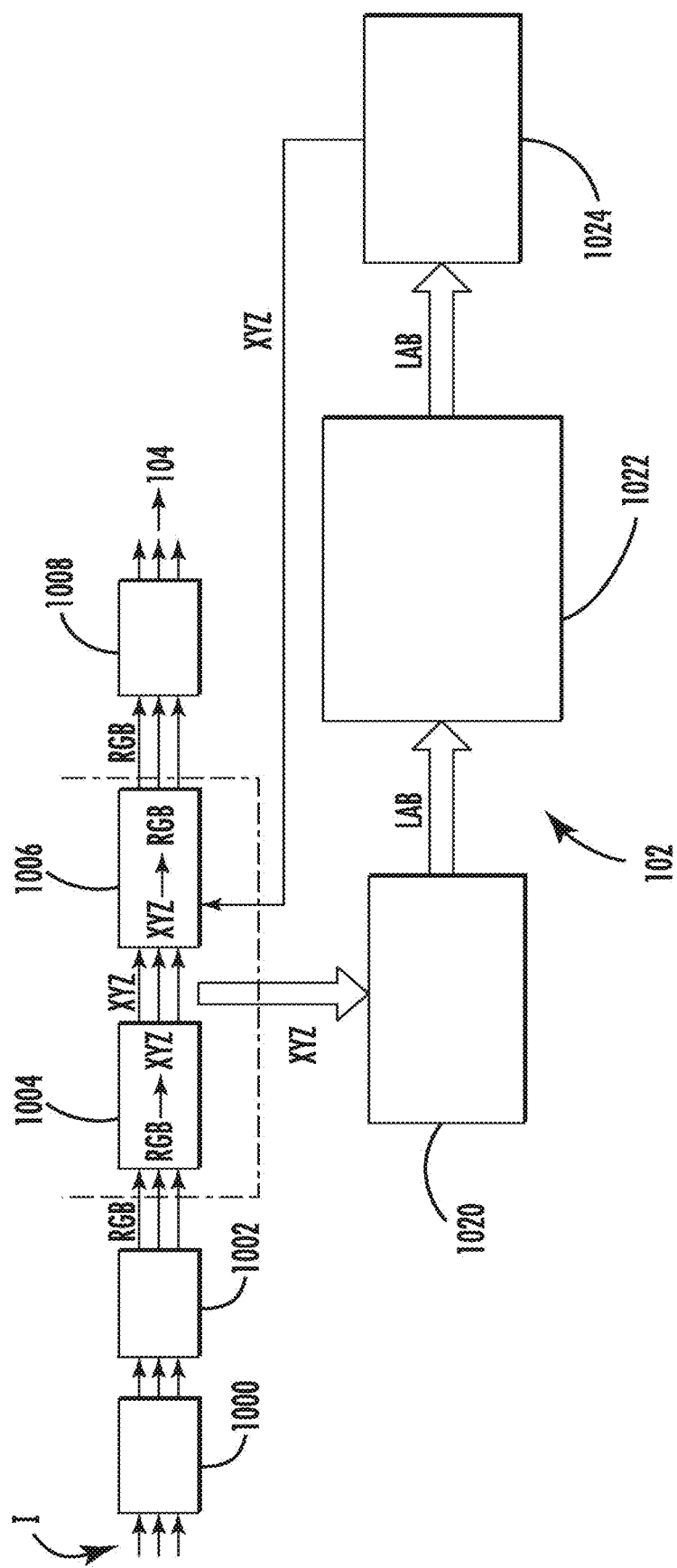

FIG. 4 exemplifies in further detail possible embodiments of radiometric compensation performed at 102 on the XYZ converted signals from the block 1004 with the results returned to the block 1006.

In a block diagram as exemplified in FIG. 4, radiometric compensation may take place pixel-wise, with each pixel first transformed in a block 1020 into a perceptually uniform workspace of the compensation procedure e.g. Lab (XYZ to Lab), to be subjected in a block 1022 to a transformation according to certain embodiments exemplified in the following. The result of transformation may then be anti-transformed in a block 1024 from Lab back to XYZ.

Figure 5:
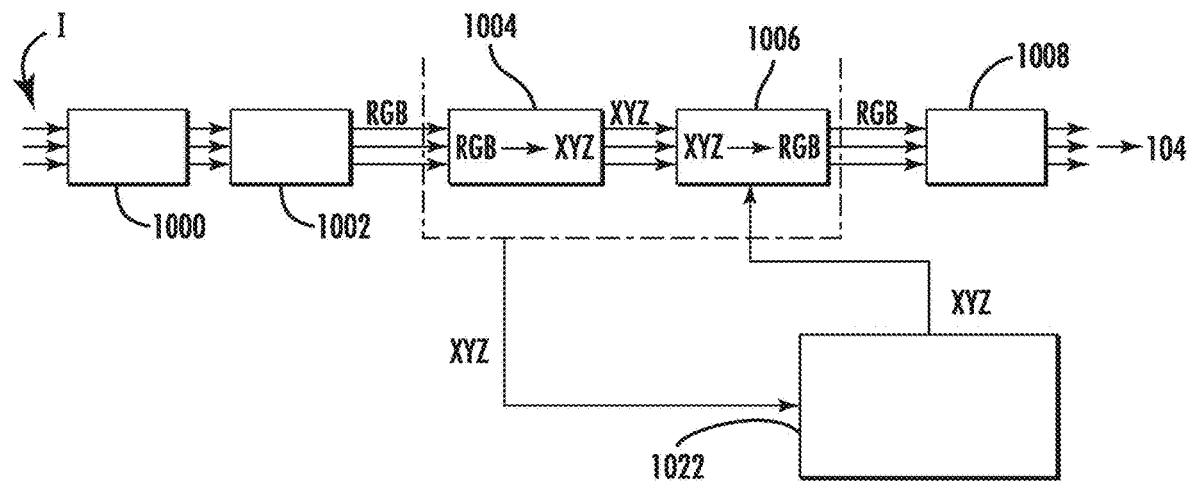

FIG. 5 is exemplary of the possibility that a "simplified" transformation may be performed in the block 1022 according to certain embodiments exemplified in the following. There, a computationally less burdensome transformation may be performed by operating directly in the XYZ workspace, with a possible reduction of the accuracy in the compensation model due to the fact that, contrary to the Lab space, the XYZ space is not perceptually uniform color space.

Figure 6:
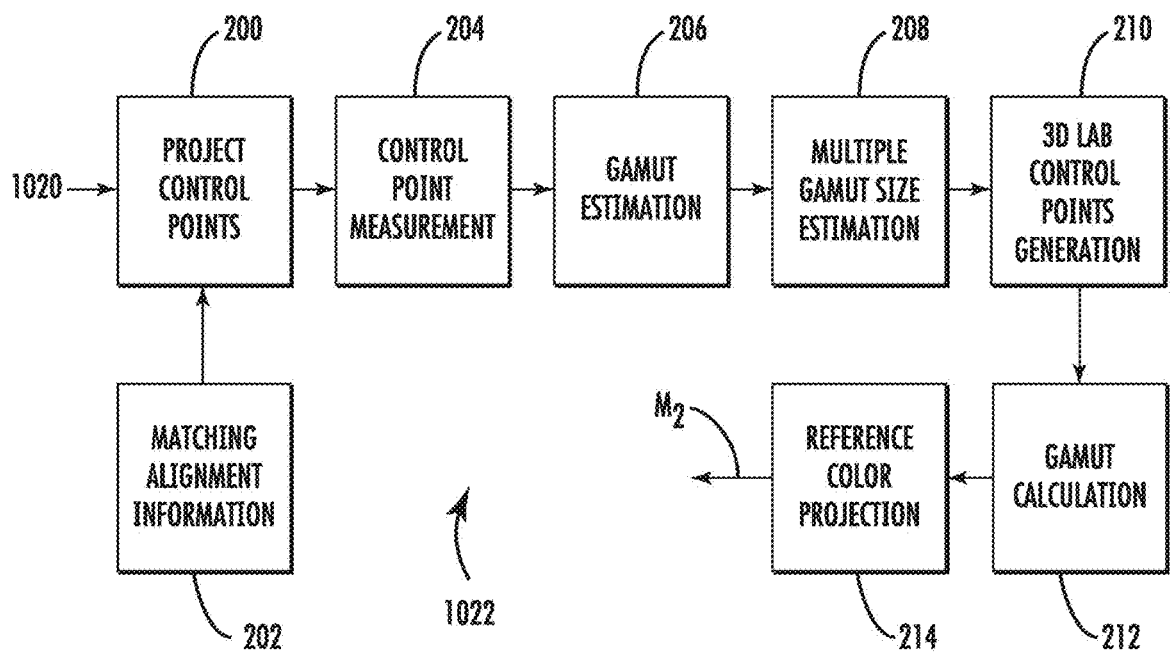
FIG. 6 is a block diagram further exemplary of one or more embodiments.

The block diagram of FIG. 6 is exemplary of a sequence of steps in embodiments adapted to be used with a projection surface S which may be considered to be essentially planar and of a uniform color.

In that case, a compensation color transformation may be used which is the same for each pixel of the image/frame projected. The block diagram of FIG. 6 is thus exemplary of a procedure to estimate the color transformation on a single color surface.

The block 200 is exemplary of a step wherein the color management block 100 controls the projector 12 (e.g. via the block 104) in order that a set of control points of a known color should be projected on the projection surface S.

This may occur either as a single color chart with a known spatial distribution (e.g. when the surface S is uniformly colored) or sequentially as projection surface patches (e.g. when the surface S is non-uniformly colored, e.g. due to some graphics painted thereon).

The foregoing may take place on the basis of camera/projector matching alignment information 202. This may be camera-projection calibration information which conveys the spatial relationship between camera and projection coordinates and has been computed previously (in any manner known in the art, for instance as widely used in those arrangements involving coordinated operation of a camera and a projector) and stored e.g. in the buffer 114.

In one or more embodiments, each control point/patch may be colored, e.g. with RGB values encoded in a sRGB standard color space, that is with a first gamut of first (sub)set of colors adapted to be represented under certain conditions by a certain output device e.g. by being projected by the projector 13.

For, e.g. each patch, the position in CIELab color space is well known if projected on a white surface:

$$[L^1_{ref}a^1_{ref}b^1_{ref}], \ldots ,[L^n_{ref}a^n_{ref}b^n_{ref}]$$

For each control point i, i=1, . . . ,n the corresponding sRGB triplet is sent to projector 12 (e.g. block 104 of FIG. 2:

$$[R^i_{ref}G^i_{ref}B^i_{ref}]$$

The value is recorded by the camera 10 and a camera colorimetric characterization model may be applied to estimate absolute XYZ or Lab values:

$$[L^i_m, a^i_m, b^i_m]$$

More specifically, the list $Lab_{ref}$ may refer to the coordinates in the Lab color space of the reference color patches, that is, the set of colors that is projected and then acquired by the camera 10 to assess the extension of the (second) color gamut on the colored projection surface S. These values may be considered for any standard color spaces, e.g. sRGB, adobeRGB.

The list $Lab_m$ relates to the values obtained from the camera 10 when projecting the RGB values to the reference patches.

In one or more embodiments n reference patches (e.g. RGB triples) may be projected on the surface S to be then acquired by the camera 10.

One or more embodiments may involve a transformation of the various triplets from the camera coordinates (a camera such as the camera 10 may have its own pixel color filters and colors may not be perceived in an absolute way) to the device-independent XYZ color space and, optionally, on to the Lab space, which—in addition to being device-independent—is perceptually uniform. The law of transformation from the camera coordinates to the XYZ space may result from calibration of the chromatic response of the camera: this may be performed in a manner which is known per se, thus making it unnecessary to provide a detailed description herein.

Figure 7:
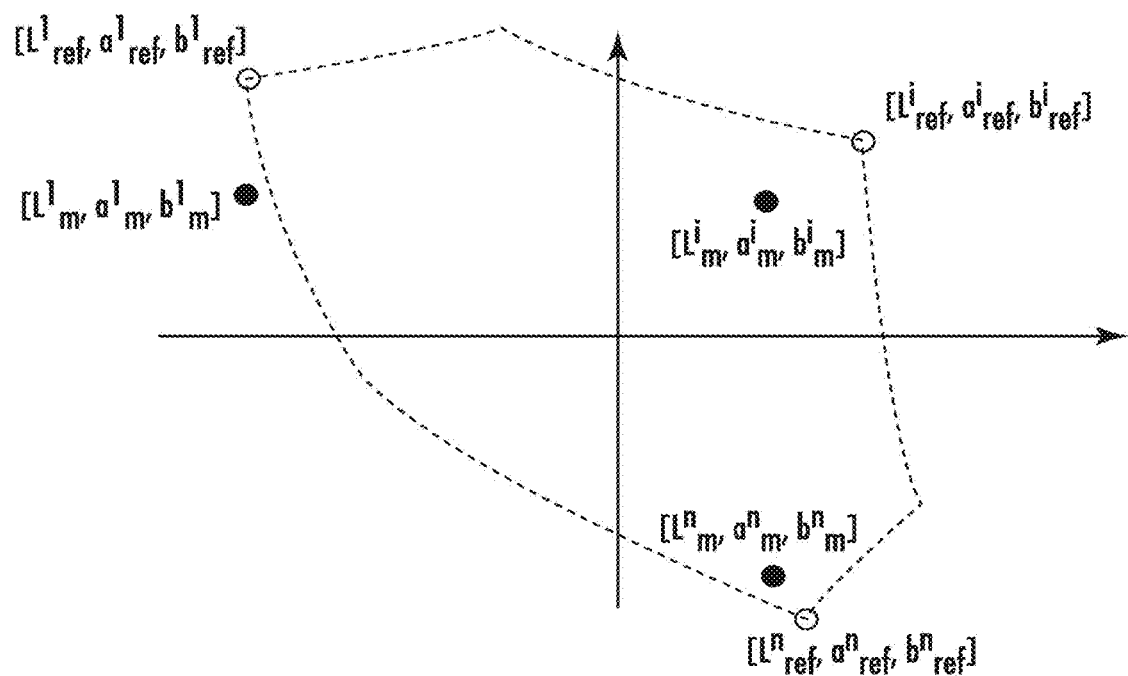
FIGS. 7 to 10 are graphs exemplary of processing according to one or more embodiments.

The graph of FIG. 7 is exemplary of possible gamut boundaries in a L(a, b) color space, that is the graph refers to the plane (a, b) of the Lab color space. The list of reference points (empty circles) contours a dashed outline (only three points are shown for simplicity. This boundary (which should be seen as including three dimensions) represents the (first) gamut in the standard color space, e.g. sRGB, for which color accuracy is pursued. The sRGB volume in the Lab Space can be considered to be known.

The list of points represented by full circles relates to the values a, b obtained from the acquisition camera 10 when the projection surface is colored. This list can be transferred to the Lab space via the transformation from the RGB (camera) to the XYZ and Lab (in step 204) spaces as discussed previously.

A transformation matrix M (e.g. 4×3) between the Lab values of the control points and their predicted Lab values may then be computed in a step 206 (e.g. M may be estimated by means of a minimization process).

The observed colors may thus be mapped into reference colors in the Lab color space by means of the matrix M:

$$\begin{bmatrix} L^1_m & a^1_m & b^1_m \\ \vdots & \vdots & \vdots \\ L^n_m & a^n_m & b^n_m \end{bmatrix} = \begin{bmatrix} L^1_{ref} & a^1_{ref} & b^1_{ref} & 1 \\ \vdots & \vdots & \vdots & \vdots \\ L^n_{ref} & a^n_{ref} & b^n_{ref} & 1 \end{bmatrix} M$$

In one or more embodiments, it is possible to estimate the coefficients of the matrix M so that the triplets acquired via the camera 10 on the colored surface S may be mapped to the reference points for the Lab color space by means of a linear transformation. The matrix M thus estimated e.g. in a step 206 allows to generate a mapping model from the reference coordinates to the color space that the camera 10 "sees" on the colored surface S. By means of M a grid in the Lab space related to a standard color space (e.g. sRGB) may be transformed in such a way that the position of the whole device gamut on the colored surface S may be predicted in a step 208.

Gamut estimation on a certain colored surface without channel clipping will be increasingly accurate as the number of points increases.

More in detail, in one or more embodiments, in the Lab color space where the transformation M is estimated, a three-dimensional grid of points may be generated which covers the reference color space (e.g. sRGB) and maps it via M.

The points adapted to be used to perform such a mapping may be assumed to be known: for instance they may derive from a uniform sub-sampling in the RGB domain and be transformed into XYZ and then Lab triplets according to a sequence of sRGB→XYZ and XYZ→Lab transformations which can be stored a priori.

Figure 8:
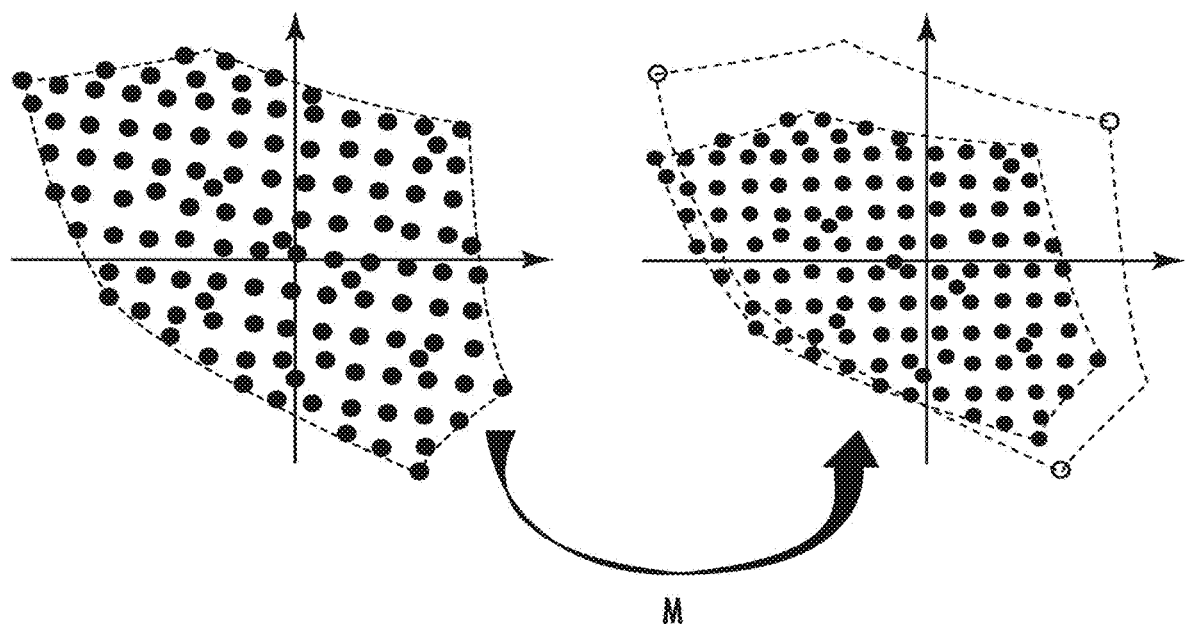

An exemplary graph of such a transformation is shown in FIG. 8. This graph is exemplary of the generation of the discrete gamut which is estimated by means of the matrix M, as visible on a colored surface S.

The projection surface S being colored will result in this (second) color gamut being "misaligned" with respect to the (first) standard gamut to be obtained.

An exemplary gamut for the color space for which color accuracy is pursued even if projection takes place on a colored surface is shown on the left.

Conversely, the right side of FIG. 8 shows the distribution of contour points in the Lab standard space in Lab, after application of the matrix M estimated previously.

Turning again to the block diagram of FIG. 6, 3D Lab control points are generated in a step 210.

To that effect, for each original control point i, i=1, . . . ,n a 3D "line" Li, i=1, . . . ,n is constructed from its location towards the average grey value.

For instance, starting from the 50,0,0 point one may have:

$$[L^i_{ref}, a^i_{ref}, b^i_{ref}] \rightarrow [g, 0, 0]$$

This line may regularly sampled by identifying the first point within the (second) gamut (e.g. as one having peak saturation).

This procedure may lead to generating a list of lines in the 3D Lab space that join the n control points and the so-called middle grey, that is the point of coordinates (50,0,0). This list of lines may be the basis of a procedure for gamut intersection.

By way of example, for each of the n generated lines Li, i=1, . . . ,n the line may be regularly sampled and the first point inside the gamut identified. This procedure may generate a list of Lab coordinates which are displayable on that color without channel clipping.

$$[L^i_p, a^i_p, b^i_p]$$

Each of the lines generated may be sampled from the point (50,0,0) to the reference point in order to obtain the point common to the two gamuts, the standard one and the "distorted" one, which is closest to the reference point. This point therefore represents the point (color) closest to the reference point which can be represented on the (colored) projection surface S.

Figure 9:
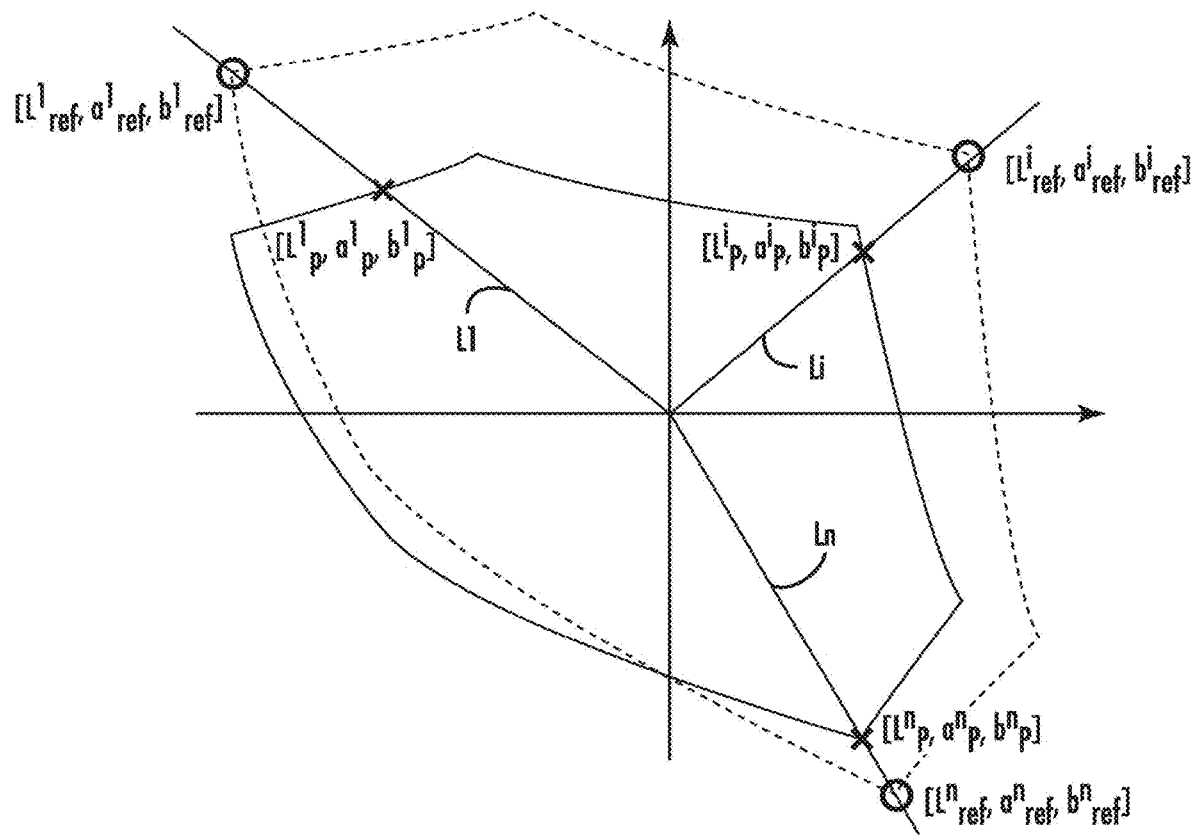

The graph of FIG. 9 is exemplary of a list of intersection points which may be obtained by the procedure just described in a displayable gamut calculation step indicated as 212 in the diagram of FIG. 6.

Exemplary gamut intersection points are shown in the a, b plane for the sake of simplicity. The list of points so generated essentially defines the gamut intersection, that is the set of colors in the standard space which may still be represented on the colored surface S.

A "final" transformation M2 (e.g. 4×3) from the original control points positions to the positions found may then be computed in a step 214, e.g.

$$\begin{bmatrix} L_p^1 & a_p^1 & b_p^1 \\ \vdots & \vdots & \vdots \\ L_p^n & a_p^n & b_p^n \end{bmatrix} = \begin{bmatrix} L_{ref}^1 & a_{ref}^1 & b_{ref}^1 & 1 \\ \vdots & \vdots & \vdots & \vdots \\ L_{ref}^n & a_{ref}^n & b_{ref}^n & 1 \end{bmatrix} M_2$$

This matrix M2 represents the mapping of the image gamut to the intersection gamut, that M2 is a "final" matrix linking the reference points to those on the intersection of the two gamuts.

This matrix may be estimated in the same way as the matrix M and may be applied pixel by pixel to the images to be projected on the colored surface S.

Figure 10:
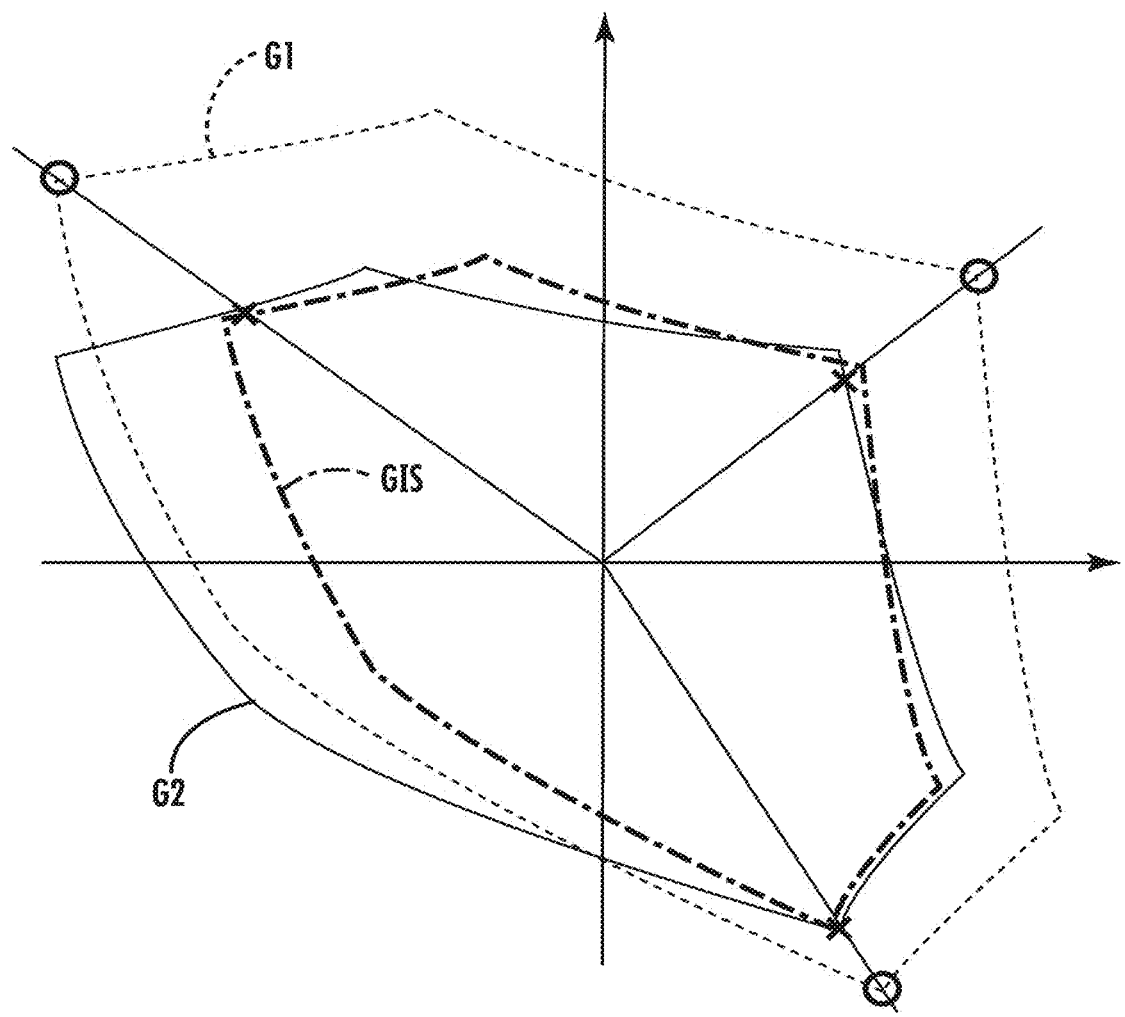

FIG. 10 is an exemplary graph which shows in the a, b plane (again, despite this simplified representation, the gamut should always be construed in three dimensions): in dashed line: the (first) gamut outline G1 in the standard space, typically sRGB, in the Lab space; in solid line: the (second) "deformed" gamut G2 on the colored surface S; in chain line: the intersection gamut GIS, that is the set of colors in the standard space which may still be represented on the colored surface.

In the following, one or more exemplary embodiments applicable to a non-uniform colored surface S will be described, wherein a (notionally) pixel-wise color transform is generated.

This procedure may require an additional step to match camera and projector coordinates. Geometric patterns are projected via the projector 12 and acquired by the camera 10 in order to generate a coordinate matching transform. A same process of color transform estimation may be carried out for each pixel and finally the set of color transforms and a 3D gamut intersection is analyzed to detect the best color transforms.

For immediate reference, in the diagram of FIG. 11, steps identical or analogous to steps already described in connection with the block diagram of FIG. 6 are indicated with the same reference numerals without unnecessarily repeating their description here.

Figure 11:
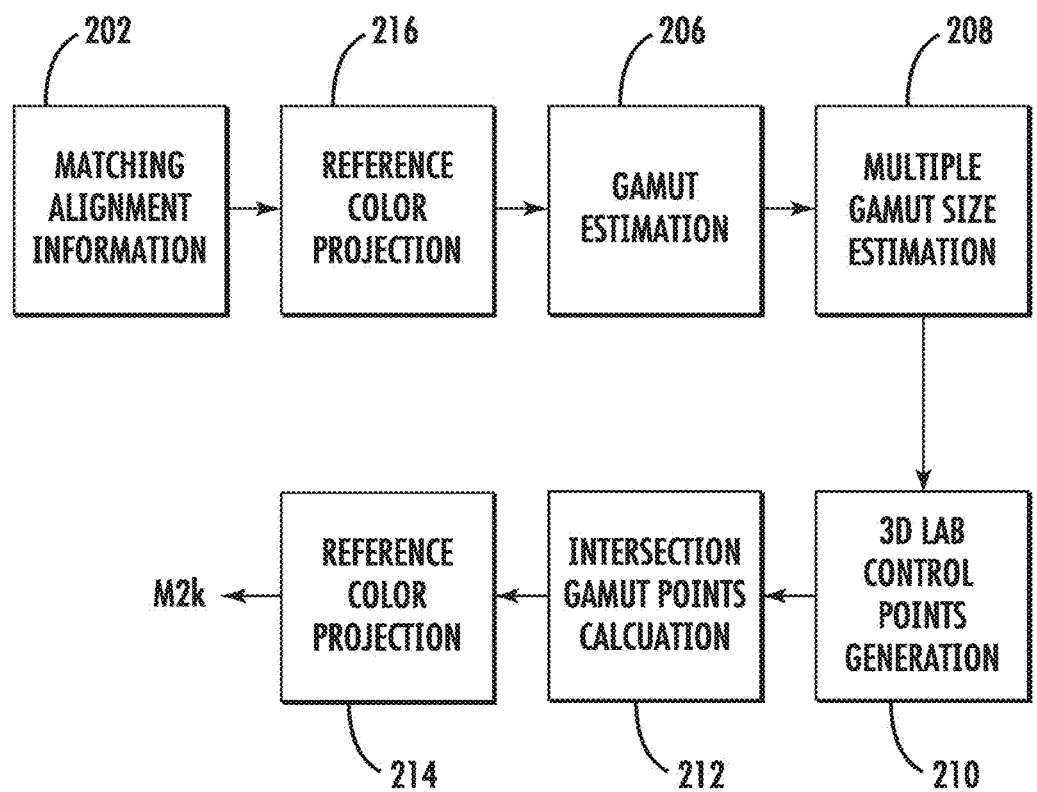
FIG. 11 is a block diagram further exemplary of one or more embodiments.

It will be appreciated that in the diagram of FIG. 11 a reference color projection step 214 is shown in the place of the control point projection step 200 and the control point measurement step 216 of the diagram of FIG. 6.

In fact, in the case where the projection surface S is not uniformly colored:

a geometric correspondence of the camera coordinates and the projector coordinates is assumed to be known (this may be achieved via a calibration process which is known per se and will not be discussed here);

the reference colors to be projected in step 214 may be projected sequentially thus occupying the entire frame projection; this is in contrast to the case of a uniformly colored surface, where the reference colors may be projected simultaneously in step 200 of FIG. 6 thus speeding up the calibration phase;

estimation of the gamuts which may be represented and the generation of the matrixes M and M2 (e.g. steps 206 onwards) may need to be repeated, possibly for each pixel; notionally this may involve obtaining a compensation transformation M2$k$, $k=1, \ldots, K$ for each pixel of the image to be projected.

In one or more embodiments as exemplified by the diagram of FIG. 11, N color patches (control points) may be sequentially projected in step 214.

To make the arrangement more suitable for implementation as an embedded system and reasonably simple, pixels may colorimetrically clustered into a limited number of color classes, evaluated according to e.g. Euclidean distances or other colorimetric measurements e.g. Color[i,j] <DeltaE_threshold.

For each color class, a displayable gamut process may performed in a "multiple" gamut size estimation step 208 which may be based on the same approach of the "uniform surface" embodiment discussed in the foregoing and is repeated for each color class, with the final intersection of all gamuts taken as a result.

In one or more embodiments, the number K of transformations M2$k$, $k=1, \ldots, K$ to be estimated may be reduced by clustering the transformations to be estimated thus reducing the computational complexity of the whole procedure.

In one or more embodiments, clustering may be based on color, in that those areas of the surface S having (according to colorimetric measurements) similar colors will be treated the same way. The number K of transformations M2$k$, $k=1, \ldots, K$ to be estimated will thus be reduced compared to the extreme case where a transformation might be estimated for each pixel.

Figure 12:
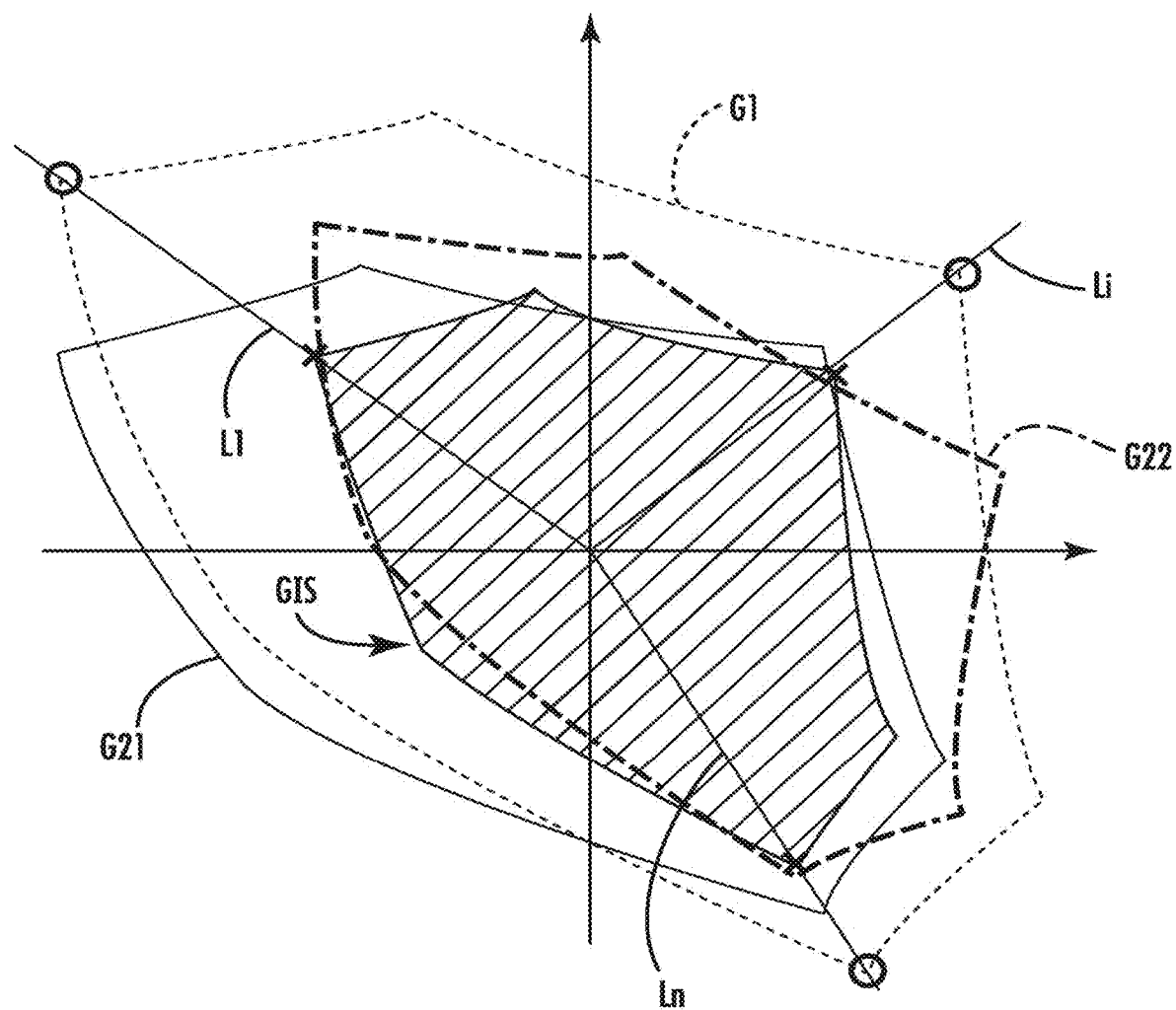
FIG. 12 is another graph exemplary of processing according to one or more embodiments.

The graph of FIG. 12 portrays the gamut intersection in the case of a surface having plural colors (just two colors are considered for the sake of simplicity).

Similarly to what has been done previously when assuming a uniformly colored surface, this is again done on a bi-dimensional a, b plane.

In this case, a multiple intersection is sought of the gamuts reproducible on the various colors of the projection surface: when wishing to project e.g. a whole frame of a uniform color, its color should be notionally reproducible in a homogeneous manner over the whole non-uniform colored projection surface, that is without the color discontinuities of the projection surface being visible.

In detail, the exemplary graph of FIG. 12 shows:

in dotted line: the gamut outline G1 on a white surface;

in solid line: one exemplary "deformed" gamut G21 on a first colored surface (surface No. 1);

in chain line: another exemplary "deformed" gamut G22 on a second colored surface (surface No. 2):

in the hatched area: the intersection gamut GIS.

As already mentioned in the foregoing in connection with FIG. 5 a "simplified" transformation may be applied to the embodiments exemplified in the following; a simplification strategy is defined adapted to render the transformation computationally less burdensome by operating directly in the XYZ workspace.

An increasing number of colors in the projection surface S may result in the intersection of the reproducible gamut becoming an increasingly restricted set of colors. This might lead to an excessively de-saturated representation of colors (e.g. resulting only in neutral hues becoming reproducible).

In one or more embodiments, this negative effect may be countered by extending the concept of intersection by introducing a control parameter so that the constraint of intersection of the various "pure" gamuts may relaxed by referring to "extended" gamuts. This leads to a recovery of chromatic saturation against of a slight increase of the degree of clipping, that is, with certain colors that cannot be represented in an exact manner over all the colored portions of the surface S but only on certain portions of the surface.

In one or more embodiments such a tradeoff in terms of channel clipping and color accuracy may be achieved by relaxing color accuracy constraints by adding a boosting action. Boosting is effecting by allowing a fixed percentage of clipping at gamut intersection.

Without prejudice to the underlying principles, the details and embodiments may vary, even significantly, with respect to what is illustrated herein purely by way of non-limiting example, without thereby departing from the extent of protection.

What is claimed is:

1. A radiometric compensation method for displaying, on a colored display surface, color signals having a first color gamut in a color space, the method comprising:
   displaying, on the colored display surface, a set of control points of a known color, the color signals having the first color gamut in the color space, wherein the colored display surface is a uniformly colored display surface;
   acquiring the set of control points as displayed on the colored display surface, wherein the set of control points displayed on the colored display surface as acquired have a single second color gamut in the color space, the second color gamut being misaligned with respect to the first color gamut;
   evaluating the misalignment of the single second color gamut with respect to the first color gamut;
   calculating a single color transformation operator as a function of the misalignment; and
   applying the single color transformation operator to the color signals for all pixels of the display on the uniformly colored display surface.

2. The method of claim 1, further comprising displaying on the colored display surface the color signals to which the single color transformation operator has been applied.

3. The method of claim 1, wherein evaluating the misalignment of the single second color gamut and calculating the single color transformation operator comprises:
   evaluating the misalignment of the single second color gamut with respect to the first color gamut as an intersection gamut therebetween; and
   calculating the single color transformation operator as a mapping operator mapping the first color gamut to the intersection gamut.

4. The method of claim 3, further comprising performing a boosting action of the color signals by allowing clipping at the intersection gamut.

5. The method of claim 1, wherein calculating the single color transformation operator as the function of the misalignment comprises:
   generating a set of lines joining the set of control points to a standard predetermined color;
   sampling each line in the set from the standard predetermined color by finding a point common to the first color gamut and the single second color gamut displayable on the uniformly colored display surface; and
   calculating the single color transformation operator as a transformation matrix from the set of control points to the common points found.

6. The method of claim 1, further comprising:
   converting the color signals for display on the uniformly colored display surface to a device-independent XYZ color space;
   subjecting the color signals converted to the device-independent color space to the radiometric compensation as a function of the single color transformation operator; and
   converting the color signals subjected to the radiometric compensation to conversion from the device-independent color space to a display color space for display on the uniformly colored display surface.

7. A radiometric compensation method for displaying, on a colored display surface, color signals having a first color gamut in a color space, the method comprising:
   displaying on the colored display surface a set of control points of a known color, wherein the colored display surface is a uniformly colored display surface;
   acquiring the set of control points as displayed on the colored display surface, wherein the set of control points displayed on the colored display surface as acquired have a single second color gamut in the color space, the second color gamut being misaligned with respect to the first color gamut;
   evaluating the misalignment of the single second color gamut with respect to the first color gamut;
   calculating a single color transformation operator as a function of the misalignment;
   applying the single color transformation operator to the color signals of all pixels for display on the uniformly colored display surface; and
   converting the color signals for display on the uniformly colored display surface to a perceptually uniform color space as a workspace for the radiometric compensation;
   subjecting the color signals converted to the perceptually uniform color space to the radiometric compensation as a function of the single color transformation operator; and
   converting the color signals subjected to the radiometric compensation to conversion from the perceptually uniform color space to a display color space for display on the uniformly colored display surface.

8. The method of claim 7, further comprising displaying on the colored display surface the color signals to which the single color transformation operator has been applied.

9. The method of claim 7, wherein evaluating the misalignment of the single second color gamut and calculating the single color transformation operator comprises:
   evaluating the misalignment of the single second color gamut with respect to the first color gamut as an intersection gamut therebetween; and
   calculating the single color transformation operator as a mapping operator mapping the first color gamut to the intersection gamut.

10. The method of claim 9, further comprising performing a boosting action of the color signals by allowing clipping at the intersection gamut.

11. The method of claim 7, further comprising:
    generating a set of lines joining the set of control points to a middle grey color;
    sampling each line in the set from the middle grey color by finding a point common to the first color gamut and the single second color gamut displayable on the uniformly colored display surface; and
    calculating the single color transformation operator as a transformation matrix from the set of control points to the common points found.

12. The method of claim 7, further comprising:
    converting the color signals for display on the uniformly colored display surface to a device-independent XYZ color space;

subjecting the color signals converted to the device-independent color space to the radiometric compensation as a function of the single color transformation operator; and converting the color signals subjected to the radiometric compensation to conversion from the device-independent color space to a display color space for display on the uniformly colored display surface.

13. A radiometric compensation method for displaying, on a colored display surface, color signals having a first color gamut in a color space, the method comprising:

displaying, on the colored display surface, a set of control points of a known color, wherein the colored display surface is a colored display surface having a display surface of a single color;

acquiring the set of control points as displayed on the colored display surface, wherein the set of control points displayed on the colored display surface as acquired have a single second color gamut in the color space, the second color gamut being misaligned with respect to the first color gamut;

evaluating the misalignment of the single second color gamut with respect to the first color gamut;

calculating a single color transformation operator as a function of the misalignment;

applying the single color transformation operator to the color signals for display on the colored display surface;

generating a set of lines joining the set of control points to a middle grey color;

sampling each line in the set from the middle grey color by finding a point common to the first color gamut and the single second color gamut displayable on the colored display surface; and calculating the single color transformation operator as a transformation matrix from the set of control points to the common points found.

14. The method of claim 13, further comprising displaying on the colored display surface the color signals to which the single color transformation operator has been applied.

15. The method of claim 13, wherein evaluating the misalignment of the single second color gamut and calculating the single color transformation operator comprises:

evaluating the misalignment of the single second color gamut with respect to the first color gamut as an intersection gamut therebetween; and calculating the single color transformation operator as a mapping operator mapping the first color gamut to the intersection gamut.

16. The method of claim 15, further comprising performing a boosting action of the color signals by allowing clipping at the intersection gamut.

17. The method of claim 13, further comprising:

converting the color signals for display on the colored display surface to a device-independent XYZ color space;

subjecting the color signals converted to the device-independent color space to the radiometric compensation as a function of the single color transformation operator; and converting the color signals subjected to the radiometric compensation to conversion from the device-independent color space to a display color space for display on the colored display surface.

* * * * *